US011945466B2

(12) United States Patent
Nagaoka et al.

(10) Patent No.: US 11,945,466 B2
(45) Date of Patent: Apr. 2, 2024

(54) DETECTION DEVICE, VEHICLE SYSTEM, DETECTION METHOD, AND PROGRAM

(71) Applicant: HONDA MOTOR CO., LTD., Tokyo (JP)

(72) Inventors: Nobuharu Nagaoka, Wako (JP); Takayuki Tsuji, Wako (JP); Yuki Sugano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 178 days.

(21) Appl. No.: 17/674,931

(22) Filed: Feb. 18, 2022

(65) Prior Publication Data

US 2022/0315038 A1 Oct. 6, 2022

(30) Foreign Application Priority Data

Mar. 30, 2021 (JP) ................. 2021-058077

(51) Int. Cl.
*B60W 40/00* (2006.01)
*B60W 40/11* (2012.01)
*B60W 40/112* (2012.01)
*B60W 60/00* (2020.01)

(52) U.S. Cl.
CPC .......... *B60W 60/001* (2020.02); *B60W 40/11* (2013.01); *B60W 40/112* (2013.01); *B60W 2420/403* (2013.01); *B60W 2420/408* (2024.01)

(58) Field of Classification Search
None
See application file for complete search history.

(56) References Cited

U.S. PATENT DOCUMENTS

2022/0180643 A1* 6/2022 Retterath .................. G06T 7/20

FOREIGN PATENT DOCUMENTS

| JP | 3808287 | 8/2006 |
| JP | 2015-075382 | 4/2015 |
| JP | 2019-138672 | 8/2019 |
| JP | 2020-032986 | 3/2020 |
| JP | 2020-098550 | 6/2020 |

OTHER PUBLICATIONS

Japanese Office Action for Japanese Patent Application No. 2021-058077 dated Aug. 30, 2022.

* cited by examiner

*Primary Examiner* — James M McPherson
(74) *Attorney, Agent, or Firm* — Amin, Turocy & Watson, LLP

(57) ABSTRACT

A detection device includes: an acquisition unit configured to acquire a detection result of a plurality of targets present in a traveling direction of a vehicle from an imaging device attached to the vehicle; a calculation unit configured to determine whether the plurality of targets detected with movement of the vehicle are an identical target based on the detection result acquired by the acquisition unit and calculate a coordinate of each of the plurality of targets in chronological order; and a detection unit configured to detect a pitch angle and a roll angle of the imaging device with respect to a horizontal direction based on the coordinate calculated in chronological order by the calculation unit.

8 Claims, 7 Drawing Sheets

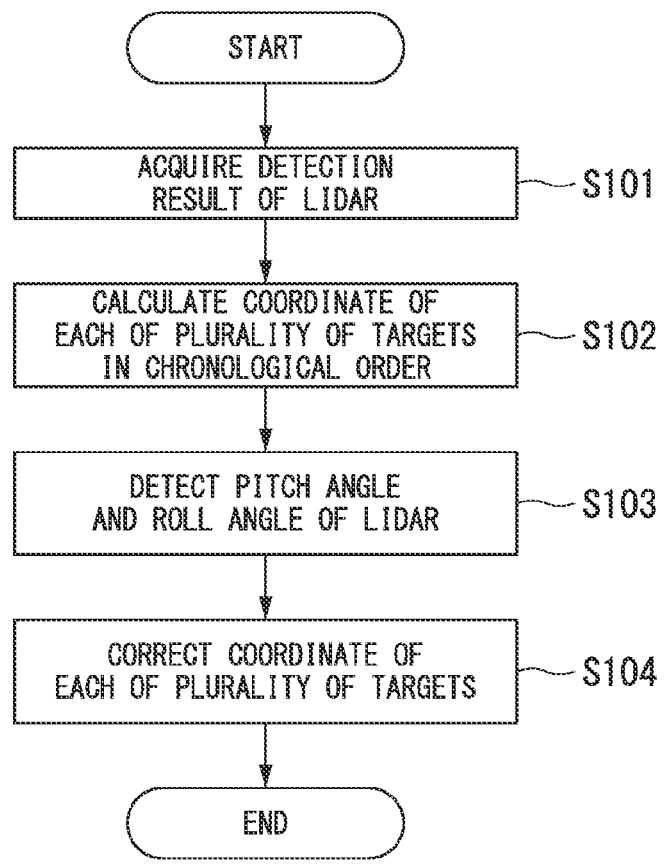

DETECTION DEVICE, VEHICLE SYSTEM, DETECTION METHOD, AND PROGRAM

CROSS-REFERENCE TO RELATED APPLICATION

Priority is claimed on Japanese Patent Application No. 2021-058077, filed on Mar. 30, 2021, the contents of which are incorporated herein by reference.

BACKGROUND

Field of the Invention

The present invention relates to a detection device, a vehicle system, a detection method, and a program.

Background

In recent years, studies on automatic control of vehicles have been conducted. In automated control of a vehicle, the position of an object in the periphery of the vehicle is detected using an imaging device such as light detection and ranging (LIDAR) attached to the vehicle. For this reason, when the imaging device is attached while inclined with respect to the horizontal direction, the position of the object can be erroneously detected. Therefore, Japanese Patent No. 3808287 discloses a technology for detecting a pitch angle of an imaging device attached to a vehicle.

SUMMARY

However, in the technology described in Japanese Patent No. 3808287, when an imaging device is inclined not only in a pitch direction but also in a roll direction, both the pitch angle and the roll angle of the imaging device with respect to a horizontal direction may not be simultaneously and accurately detected in some cases.

One object of an aspect of the present invention is to provide a detection device, a vehicle system, a detection method, and a program capable of simultaneously and accurately detecting both a pitch angle and a roll angle of an imaging device with respect to a horizontal direction.

A detection device according to a first aspect of the present invention includes: an acquisition unit configured to acquire a detection result of a plurality of targets present in a traveling direction of a vehicle from an imaging device attached to the vehicle; a calculation unit configured to determine whether the plurality of targets detected with movement of the vehicle are an identical target based on the detection result acquired by the acquisition unit and calculate a coordinate of each of the plurality of targets in chronological order; and a detection unit configured to detect a pitch angle and a roll angle of the imaging device with respect to a horizontal direction based on the coordinate calculated in chronological order by the calculation unit.

A second aspect is the detection device according to the first aspect, wherein the plurality of targets may include a first target present on a right side in the traveling direction of the vehicle and a second target present on a left side in the traveling direction of the vehicle, the calculation unit may calculate a first coordinate indicating a coordinate of the first target in chronological order, and may calculate a second coordinate indicating a coordinate of the second target in chronological order, and the detection unit may detect the pitch angle and the roll angle based on the first coordinate and the second coordinate that are calculated by the calculation unit.

A third aspect is the detection device according to the first or the second aspect which may further include a correction unit configured to correct the coordinate of each of the plurality of targets based on the pitch angle and the roll angle that are detected by the detection unit.

A fourth aspect is the detection device according to the third aspect, wherein when at least one of the pitch angle and the roll angle that are detected by the detection unit exceeds a preset threshold value, the correction unit may output a correction value for correcting the coordinate of each of the plurality of targets to the imaging device instead of correcting the coordinate of each of the plurality of targets.

A fifth aspect is the detection device according to any one of the first to the fourth aspects, wherein the acquisition unit may acquire a detection result of an angular speed around a vertical axis of the vehicle from a yaw rate sensor attached to the vehicle, and the detection unit may not detect the pitch angle and the roll angle when the detection result from the yaw rate sensor which is acquired by the acquisition unit is not within a predetermined range.

A sixth aspect is the detection device according to any one of the first to the fifth aspects, wherein the imaging device may be an LIDAR that detects a distance from the vehicle to each of the plurality of targets.

A vehicle system according to a seventh aspect of the present invention includes: the detection device according to any one of the first to the sixth aspects; and a control device configured to control the vehicle according to the coordinate of each of the plurality of targets.

A detection method according to an eighth aspect of the present invention includes: by a computer, acquiring a detection result of a plurality of targets present in a traveling direction of a vehicle from an imaging device attached to the vehicle; determining whether the plurality of targets detected with movement of the vehicle are an identical target based on the detection result, and calculating a coordinate of each of the plurality of targets in chronological order; and detecting a pitch angle and a roll angle of the imaging device with respect to a horizontal direction based on the coordinate calculated in chronological order.

A ninth aspect of the present invention is a computer-readable non-transitory storage medium which includes a program causing a computer to execute: acquiring a detection result of a plurality of targets present in a traveling direction of a vehicle from an imaging device attached to the vehicle; determining whether the plurality of targets detected with movement of the vehicle are an identical target based on the detection result, and calculating a coordinate of each of the plurality of targets in chronological order; and detecting a pitch angle and a roll angle of the imaging device with respect to a horizontal direction based on the coordinate calculated in chronological order.

According to the first to the ninth aspects, it is possible to detect both a pitch angle and a roll angle of an imaging device with respect to a horizontal direction simultaneously and accurately.

BRIEF DESCRIPTION OF THE DRAWINGS

FIG. 12 is a flowchart which shows a flow of processing executed by a detection device.

DESCRIPTION OF EMBODIMENTS

Hereinafter, embodiments of a detection device, a vehicle system, a detection method, and a program according to the present invention will be described with reference to the drawings.

[Overall Configuration]

Figure 1:
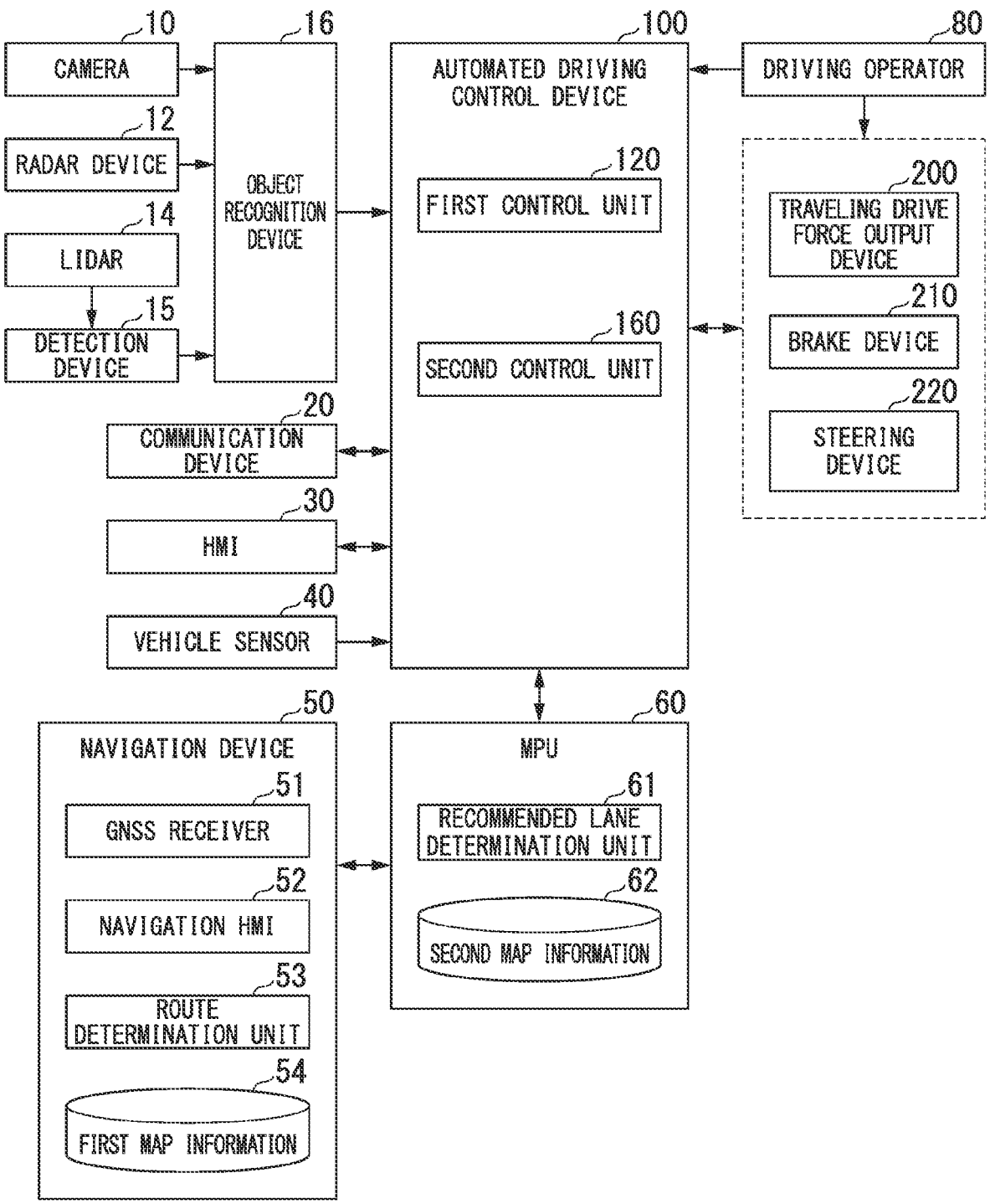
FIG. 1 is a configuration diagram of a vehicle system using a vehicle control device according to an embodiment.

FIG. 1 is a configuration diagram of a vehicle system 1 using a vehicle control device according to an embodiment. A vehicle in which the vehicle system 1 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination of these. The electric motor operates by using electric power generated by a generator connected to the internal combustion engine or discharge power of secondary batteries or fuel cells.

The vehicle system 1 includes, for example, a camera 10, a radar device 12, a LIDAR 14, a detection device 15, an object recognition device 16, a communication device 20, a human machine interface (HMI) 30, a vehicle sensor 40, a navigation device 50, a map positioning unit (MPU) 60, a driving operator 80, an automated driving control device 100, a traveling drive force output device 200, a brake device 210, and a steering device 220. These devices and apparatuses are connected to each other by a multiplex communication line such as a controller area network (CAN) communication line, a serial communication line, a wireless communication network, or the like. The configuration shown in FIG. 1 is merely an example, and a part of the configuration may be omitted or another configuration may be added.

The camera 10 is a digital camera that uses a solid-state image sensor such as a charge coupled device (CCD) or a complementary metal oxide semiconductor (CMOS). The camera 10 is attached to an arbitrary place in a vehicle M in which the vehicle system 1 is mounted. When an image of the front is captured, the camera 10 is attached to an upper part of the front windshield, a back surface of the windshield rear-view mirror, and the like. The camera 10 periodically and repeatedly captures, for example, an image of a periphery of the vehicle M. The camera 10 may be a stereo camera.

The radar device 12 radiates radio waves such as millimeter waves to the periphery of the vehicle M, and detects radio waves (reflected waves) reflected by an object to detect at least a position (distance and direction) of the object. The radar device 12 is attached to an arbitrary place on the vehicle M. The radar device 12 may detect the position and a speed of the object by a frequency modulated continuous wave (FM-CW) method.

The LIDAR 14 irradiates the periphery of the vehicle M with light (or an electromagnetic wave having a wavelength close to that of light) and measures scattered light. The LIDAR 14 detects a distance to a target on the basis of a time from light emission to light reception. The emitted light is, for example, a pulsed laser beam. The LIDAR 14 is attached to arbitrary place of the vehicle M. The LIDAR 14 detects a distance from the vehicle M to the target by performing a scan in horizontal and vertical directions with respect to the traveling direction of the vehicle M.

The detection device 15 detects a deviation of a mounting angle of the LIDAR 14 with respect to the horizontal direction on the basis of a result of detection by the LIDAR 14. Specifically, the detection device 15 detects both the pitch angle and the roll angle of the LIDAR 14 with respect to the horizontal direction. Details of a detection method performed by the detection device 15 will be described below. The detection device 15 corrects the result of detection by the LIDAR 14 on the basis of the detected pitch angle and roll angle, and outputs the corrected detection result to the object recognition device 16. A function of the detection device 15 may be incorporated into the LIDAR 14, and the detection device 15 may be omitted from the vehicle system 1.

The object recognition device 16 performs sensor fusion processing on a result of detection by some or all of the camera 10, the radar device 12, and the LIDAR 14, and recognizes the position, type, speed, and the like of an object. The object recognition device 16 outputs a result of recognition to the automated driving control device 100. The object recognition device 16 may output the results of detection by the camera 10, the radar device 12, and the LIDAR 14 to the automated driving control device 100 as they are. A function of the object recognition device 16 may be incorporated into the automated driving control device 100 and the object recognition device 16 may also be omitted from the vehicle system 1.

The communication device 20 communicates with other vehicles present in the periphery of the vehicle M by using, for example, a cellular network, a Wi-Fi network, Bluetooth (a registered trademark), dedicated short range communication (DSRC), or the like, or communicates with various server devices via a wireless base station.

The HMI 30 presents various types of information to an occupant of the vehicle M and receives an input operation by the occupant. The HMI 30 includes various display devices, a speaker, a buzzer, a touch panel, a switch, a key and the like.

The vehicle sensor 40 includes a vehicle speed sensor that detects a speed of the vehicle M, an acceleration sensor that detects an acceleration, a yaw rate sensor that detects an angular speed around a vertical axis, an azimuth sensor that detects a direction of the vehicle M, and the like.

The navigation device 50 includes, for example, a global navigation satellite system (GNSS) receiver 51, a navigation HMI 52, and a route determination unit 53. The navigation device 50 holds first map information 54 in a storage device such as an HDD or a flash memory. The GNSS receiver 51 identifies the position of the vehicle M based on a signal received from a GNSS satellite. The position of the vehicle M may be identified or complemented by an inertial navigation system (INS) using an output of the vehicle sensor 40. The navigation HMI 52 includes a display device, a speaker, a touch panel, a key, and the like. The navigation HMI 52 may be partially or entirely shared with the HMI 30 described above. The route determination unit 53 determines, for example, a route from the position of the vehicle M (or an arbitrary position to be input) identified by the GNSS receiver 51 to a destination to be input by the occupant using the navigation HMI 52 (hereinafter, a route on a map) with reference to the first map information 54. The first map information 54 is, for example, information in which a road shape is expressed by a link indicating a road and nodes connected by a link. The first map information 54 may include a road curvature, point of interest (POI) information, and the like. A route on a map is output to the MPU 60. The navigation device 50 may perform route guidance using the navigation HMI 52 based on the route on a map. The navigation device 50 may be realized by, for example, a function of a terminal device such as a smartphone or a tablet terminal owned by the occupant. The navigation device 50 may transmit a current position and a destination to a navigation server via the communication device 20 and acquire a route equivalent to the route on a map from the navigation server.

The MPU 60 includes, for example, a recommended lane determination unit 61, and holds second map information 62 in a storage device such as an HDD or a flash memory. The recommended lane determination unit 61 divides the route on a map provided from the navigation device 50 into a plurality of blocks (for example, divides every 100 [m] in a vehicle traveling direction), and determines a recommended lane for each block with reference to the second map information 62. The recommended lane determination unit 61 determines which numbered lane from the left to drive.

When a branch place is present on the route on a map, the recommended lane determination unit 61 determines a recommended lane so that the vehicle M can travel on a reasonable route to proceed to the branch destination.

The second map information 62 is map information with higher accuracy than the first map information 54. The second map information 62 includes, for example, information on a center of a lane, information on a boundary of the lane, and the like. In addition, the second map information 62 may include road information, traffic regulation information, address information (addresses/zip codes), facility information, telephone number information, and the like. The second map information 62 may be updated at any time by the communication device 20 communicating with another device.

The driving operator 80 includes, for example, an accelerator pedal, a brake pedal, a shift lever, a steering wheel, odd-shaped steering, a joystick, and other operators. The driving operator 80 is attached to a sensor that detects the amount of operation or a presence or absence of an operation, and a result of detection is output to the automated driving control device 100, or some or all of the traveling drive force output device 200, the brake device 210, and the steering device 220.

The automated driving control device 100 includes, for example, a first control unit 120 and a second control unit 160. The first control unit 120 and the second control unit 160 are realized by, for example, a hardware processor such as a central processing unit (CPU) executing a program (software), respectively. In addition, some or all of these components may be realized by hardware (a circuit unit; including circuitry) such as large scale integration (LSI), an application specific integrated circuit (ASIC), a field-programmable gate array (FPGA), or a graphics processing unit (GPU), or may be realized by software and hardware in cooperation. A program may be stored in advance in a storage device (a storage device having a non-transitory storage medium) such as an HDD or flash memory of the automated driving control device 100, or may be stored in a detachable storage medium such as a DVD or a CD-ROM and installed in the HDD or flash memory of the automated driving control device 100 by the storage medium (non-transitory storage medium) being attached to a drive device.

Figure 2:
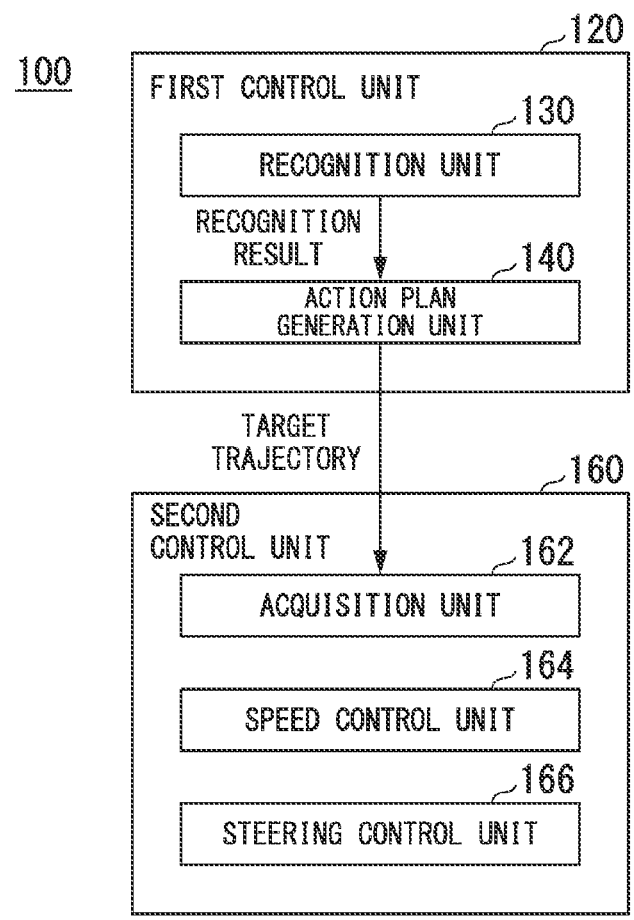
FIG. 2 is a functional configuration diagram of a first control unit and a second control unit.

FIG. 2 is a functional configuration diagram of the first control unit 120 and the second control unit 160. The first control unit 120 includes, for example, a recognition unit 130 and an action plan generation unit 140. The first control unit 120 realizes, for example, a function by artificial intelligence (AI) and a function of a predetermined model in parallel. For example, a function of "recognizing an intersection" may be realized by executing both recognition of an intersection by deep learning and recognition based on a predetermined condition (a signal for pattern matching, a road sign, or the like) in parallel, and scoring and comprehensively evaluating the both. As a result, reliability of automated driving is ensured.

The recognition unit 130 recognizes the position of an object in the periphery of the vehicle M and states such as a speed and acceleration thereof based on information input from the camera 10, the radar device 12, and the LIDAR 14 via the object recognition device 16 (and the detection device 15). The position of an object is recognized as, for example, a position on absolute coordinates with a representative point (a center of gravity, a center of a drive axis, or the like) of the vehicle M as an origin, and is used for control. The position of an object may be represented by a representative point such as the center of gravity or a corner of the object, or may be represented by an expressed area. The "states" of an object may include the acceleration or jerk of the object, or a "behavioral state" (for example, whether a lane is being changed or is about to be changed).

In addition, the recognition unit 130 recognizes, for example, a lane (a traveling lane) in which the vehicle M is traveling.

For example, the recognition unit 130 recognizes a traveling lane by comparing a pattern of road lane marking (for example, an array of solid lines and broken lines) obtained from the second map information 62 with a pattern of road lane marking in the periphery of the vehicle M recognized from an image captured by the camera 10. The recognition unit 130 may also recognize a traveling lane by recognizing not only the road lane marking but also road boundaries including the road lane marking, a road shoulder, a curb, a median strip, a guardrail, and the like. In this recognition, the position of the vehicle M acquired from the navigation device 50 and a result of processing by the INS may be taken into account. Moreover, the recognition unit 130 recognizes stop lines, obstacles, red lights, tollhouses, and other road events.

The recognition unit 130 recognizes the position and a posture of the vehicle M with respect to a traveling lane when the traveling lane is recognized. The recognition unit 130 may recognize, for example, a deviation of a reference point of the vehicle M from a center of a lane and an angle formed with respect to a line connecting the center of the lane in the traveling direction of the vehicle M as the relative position and posture of the vehicle M with respect to the traveling lane. Instead, the recognition unit 130 may recognize the position or the like of the reference point of the vehicle M with respect to any side end (a road lane marking or a road boundary) of the traveling lane as the relative position of the vehicle M with respect to the traveling lane.

In principle, the action plan generation unit 140 travels on a recommended lane determined by the recommended lane determination unit 61, and further generates a target trajectory in which the vehicle M will automatically (regardless of an operation by a driver) travel in the future to be able to respond to surrounding conditions of the vehicle M. The target trajectory contains, for example, a speed element. For example, the target trajectory is expressed as a sequence of points (trajectory points) to be reached by the vehicle M. The trajectory point is a point to be reached by the vehicle M for each predetermined traveling distance (for example, about several [m]) along a road, and separately from this, a target speed and a target acceleration for each predetermined sampling time (for example, about several decimal number [sec]) are generated as a part of the target trajectory. In addition, the trajectory point may be a position to be reached by the vehicle M at a corresponding sampling time for each predetermined sampling time. In this case, information of the target speed and the target acceleration is expressed by an interval of the trajectory points.

The action plan generation unit 140 may set an event of automated driving when a target trajectory is generated. The event of automated driving includes a constant-speed traveling event, a low-speed following traveling event, a lane change event, a branching event, a merging event, and a takeover event. The action plan generation unit 140 generates a target trajectory according to an activated event.

The second control unit 160 controls the traveling drive force output device 200, the brake device 210, and the steering device 220 so that the vehicle M passes through a target trajectory generated by the action plan generation unit 140 at a scheduled time.

The second control unit 160 includes, for example, an acquisition unit 162, a speed control unit 164, and a steering control unit 166. The acquisition unit 162 acquires information on a target trajectory (trajectory points) generated by the action plan generation unit 140 and stores it in a memory (not shown). The speed control unit 164 controls the traveling drive force output device 200 or the brake device 210 based on a speed element associated with the target trajectory stored in the memory. The steering control unit 166 controls the steering device 220 according to a degree of bending of the target trajectory stored in the memory. Processing of the speed control unit 164 and the steering control unit 166 is realized by, for example, a combination of feedforward control and feedback control. As an example, the steering control unit 166 executes the combination of feedforward control according to a curvature of a road in front of the vehicle M and feedback control based on a deviation from the target trajectory.

The traveling drive force output device 200 outputs a traveling drive force (torque) for the vehicle to travel to the drive wheels. The traveling drive force output device 200 includes, for example, a combination of an internal combustion engine, a motor, a transmission, and the like, and an electronic control unit (ECU) that controls these. The ECU controls the configuration described above according to information input from the second control unit 160 or information input from the driving operator 80.

The brake device 210 includes, for example, a brake caliper, a cylinder that transmits a hydraulic pressure to the brake caliper, an electric motor that generates a hydraulic pressure in the cylinder, and a brake ECU. The brake ECU controls the electric motor according to the information input from the second control unit 160 or the information input from the driving operator 80 so that a brake torque according to a braking operation is output to each wheel. The brake device 210 may include a mechanism for transmitting a hydraulic pressure generated by an operation of a brake pedal included in the driving operator 80 to the cylinder via a master cylinder as a backup. The brake device 210 is not limited to the configuration described above, and may be an electronically controlled hydraulic brake device that controls an actuator according to the information input from the second control unit 160 to transmit the hydraulic pressure of the master cylinder to the cylinder.

The steering device 220 includes, for example, a steering ECU and an electric motor.

The electric motor changes, for example, a direction of a steering wheel by applying a force to a rack and pinion mechanism. The steering ECU drives the electric motor according to the information input from the second control unit 160 or the information input from the driving operator 80, and changes the direction of the steering wheel.

[Functional Configuration of Detection Device]

Figure 3:
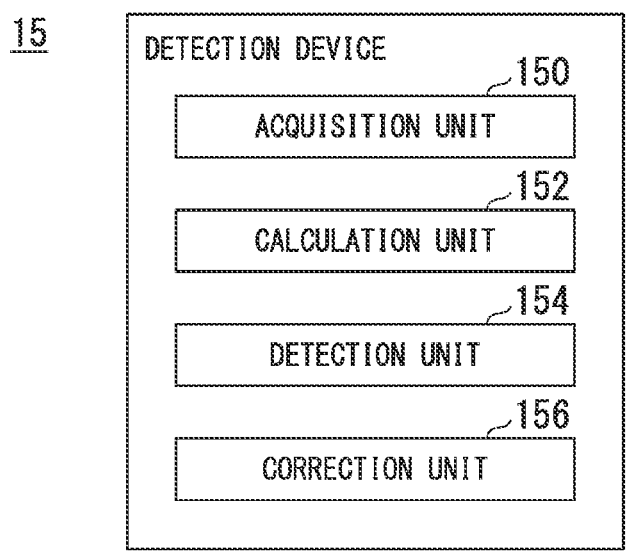
FIG. 3 is a functional configuration diagram of a detection device.

FIG. 3 is a functional configuration diagram of the detection device 15. The detection device 15 includes, for example, an acquisition unit 150, a calculation unit 152, a detection unit 154, and a correction unit 156. The acquisition unit 150, the calculation unit 152, the detection unit 154, and the correction unit 156 are each realized by a hardware processor such as a CPU executing a program (software). In addition, some or all of these components may be realized by hardware such as LSI, an ASIC, an FPGA, or a GPU, or may be realized by software and hardware in cooperation. A program may be stored in advance in a storage device (a storage device including a non-transitory storage medium) such as an HDD or flash memory of the detection device 15, or may be stored in a removable storage medium such as a DVD or CD-ROM and installed in the HDD or flash memory of the detection device 15 by the storage medium (the non-transitory storage medium) being mounted in a drive device.

The acquisition unit 150 acquires results of detection of a plurality of targets present in the traveling direction of the vehicle M from the LIDAR 14. The targets are stationary objects having high reflectance such as a roadside reflector, an eliminator, and a signboard (sign). The calculation unit 152 determines whether the plurality of targets detected with movement of the vehicle M are the same target on the basis of the results of detection acquired by the acquisition unit 150, and calculates coordinates of each of the plurality of targets in chronological order. The detection unit 154 detects the pitch angle and the roll angle of the LIDAR 14 with respect to the horizontal direction based on the coordinates calculated in chronological order by the calculation unit 152. The correction unit 156 corrects the coordinates of each of the plurality of targets based on the pitch angle and the roll angle detected by the detection unit 154. This will be described in detail below.

[Detection of Pitch Angle and Roll Angle]

Figure 4:
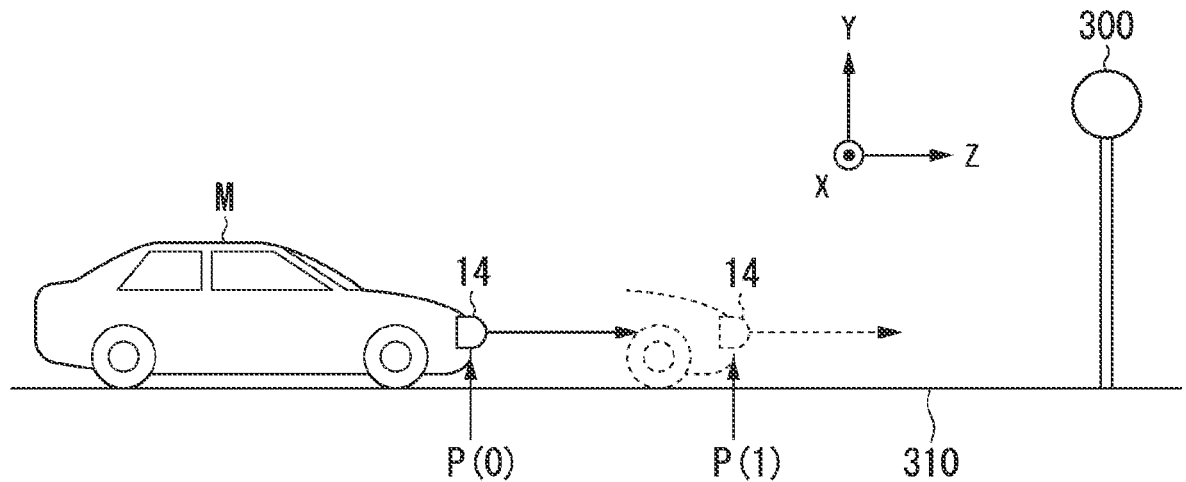
FIG. 4 is a diagram which represents how an LIDAR is attached to a vehicle while not inclined with respect to a horizontal direction.

FIG. 4 is a diagram which shows how the LIDAR 14 is attached to the vehicle M while not inclined with respect to the horizontal direction. In FIG. 4, the traveling direction of the vehicle M is a Z direction, a direction perpendicular to a horizontal road surface 310 is a Y direction, and a direction perpendicular to the Z direction and the Y direction is an X direction. The road surface 310 is provided with a target 300 that is a stationary object. Since the LIDAR 14 is attached to the vehicle M while not inclined with respect to the horizontal direction, an optical axis of the LIDAR 14 is parallel to the road surface 310.

The position of the vehicle M at a time T=0 is P(0), and the position of the vehicle M at a time T=1 is P(1). The time T=1 is a time after the time T=0. At this time, P(1) is a position closer to the target 300 than P(0).

Figure 5:
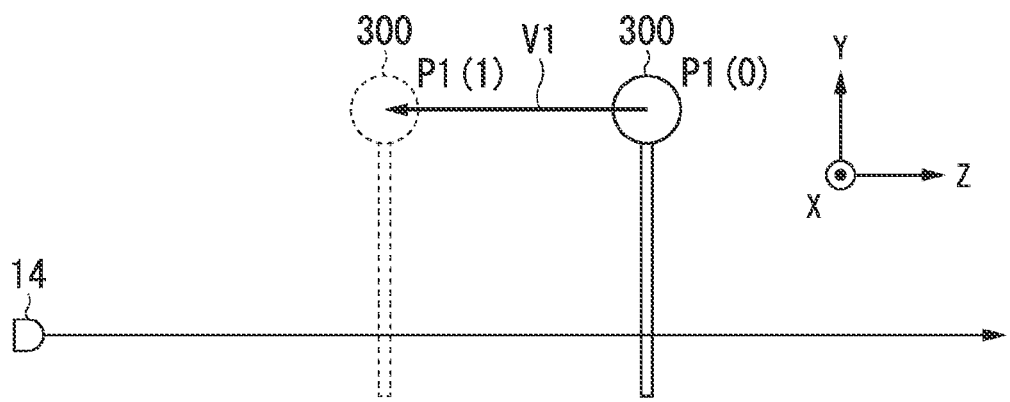
FIG. 5 is a diagram which shows relative movement of a target based on a position of the LIDAR of FIG. 4.

FIG. 5 is a diagram which shows relative movement of the target 300 with respect to a position of the LIDAR 14 in FIG. 4. As shown in FIG. 4, when the vehicle M moves from P(0) to P(1), it looks as if the target 300 has moved from P1(0) to P1(1) from the LIDAR 14 as shown in FIG. 5.

In FIG. 5, the position of the LIDAR 14 is set as an origin, an axis in the X direction passing through the origin is an X axis, an axis in the Y direction passing through the origin is a Y axis, and an axis in the Z direction passing through the origin is a Z axis. In this coordinate system, it is assumed that P1(0)=(X1(0),Y1(0),Z1(0)), and P1(1)=(X1(1),Y1(1),Z1(1)). V1 is movement vector of the target 300 from P1(0) to P1(1). Since the LIDAR 14 is attached to the vehicle M while not inclined with respect to the horizontal direction, the movement vector V1 is parallel to the Z axis.

Figure 6:
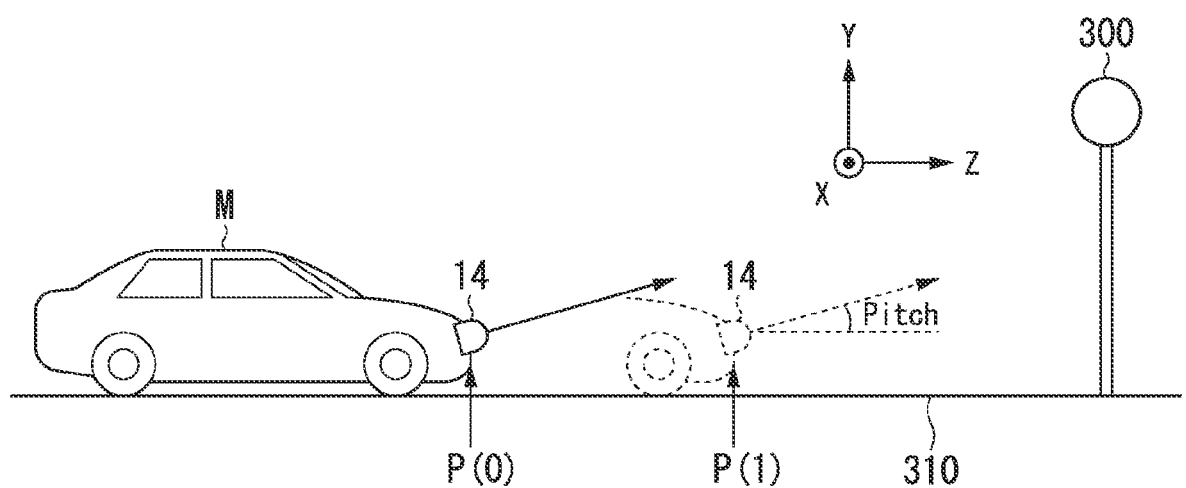
FIG. 6 is a diagram which represents how an LIDAR is attached to a vehicle while inclined only in a pitch direction.

FIG. 6 is a diagram which shows how the LIDAR 14 is attached to the vehicle M while inclined only in a pitch direction. The pitch direction is a direction of rotation about the X axis. In FIG. 6, Pitch is a pitch angle of the LIDAR 14 with respect to the horizontal direction. The LIDAR 14 is attached to the vehicle M while inclined by Pitch in the pitch direction, and the angle formed between the optical axis of the LIDAR 14 and the horizontal direction is Pitch. In FIG. 6, similarly to FIG. 4, the position of the vehicle M at the time T=0 is P(0), and the position of the vehicle M at the time T=1 is P(1).

Figure 7:
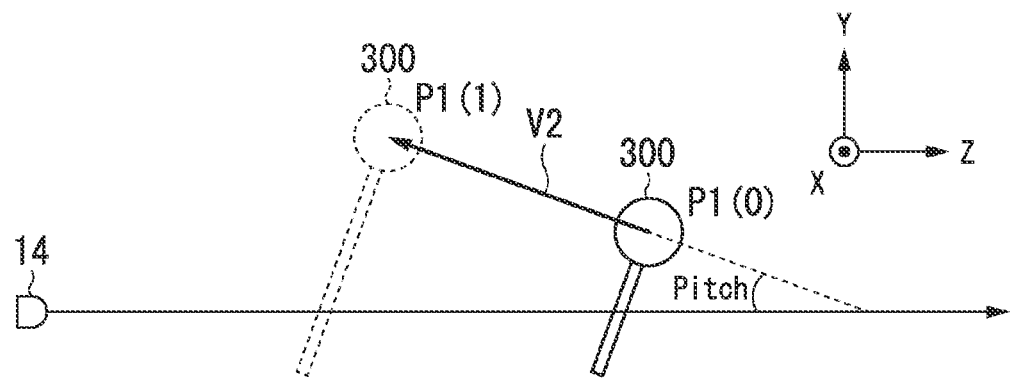
FIG. 7 is a diagram which shows relative movement of a target based on a position of the LIDAR of FIG. 6.

FIG. 7 is a diagram which shows the relative movement of the target 300 with respect to the position of the LIDAR 14 in FIG. 6. As shown in FIG. 6, when the vehicle M moves from P(0) to P(1), it looks as if the target 300 has moved from P1(0) to P1(1) from the LIDAR 14 as shown in FIG. 7. V2 is movement vector from P1(0) to P1(1). Since the LIDAR 14 is attached to the vehicle M while inclined by Pitch in the pitch direction, an angle formed between the movement vector V2 and the Z-axis direction is Pitch.

When the LIDAR 14 is attached to the vehicle M while inclined only in the pitch direction, Pitch can be obtained on the basis of the coordinates P1(0) and the coordinates P1(1). As described above, P1(0)=(X1(0),Y1(0),Z1(0)), and P1(1)=(X1(1),Y1(1),Z1(1)). For this reason, Pitch can be calculated on the basis of the following equation (1).

[Math 1]

$$\tan(\text{Pitch}) \approx \text{Pitch} = -\frac{Y1(0)-Y1(1)}{Z1(0)-Z1(1)} \text{ (rad)} \quad \text{Equation (1)}$$

However, when the LIDAR 14 is attached to the vehicle M while inclined in the pitch direction and the roll direction, the inclination in the roll direction is detected as a pitch component, and therefore the pitch angle and the roll angle cannot be calculated simultaneously and accurately in some cases. The roll direction is a direction of rotation about the Z axis. This will be described below.

Figure 8:
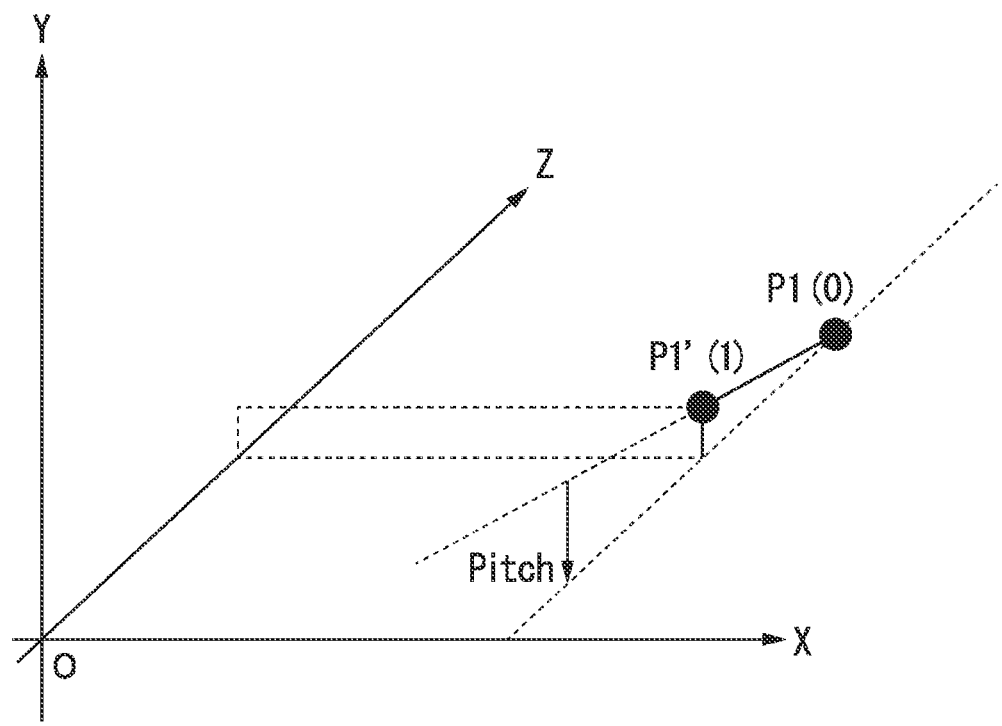
FIG. 8 is a diagram which shows movement of a target in an XYZ coordinate system when an LIDAR is attached to a vehicle while inclined only in the pitch direction.

FIG. 8 is a diagram which shows the movement of the target 300 in the XYZ coordinate system when the LIDAR 14 is attached to the vehicle M while inclined only in the pitch direction. In FIG. 8, the position of LIDAR 14 is set as an origin O. P1(0) is the coordinates of the target 300 at the time T=0, and P1'(1) is the coordinates of the target 300 at the time T=1. An angle formed by a straight line connecting P1(0) and P1'(1) and a horizontal plane (an XZ plane) is equal to the pitch angle (Pitch) of the LIDAR 14.

Figure 9:
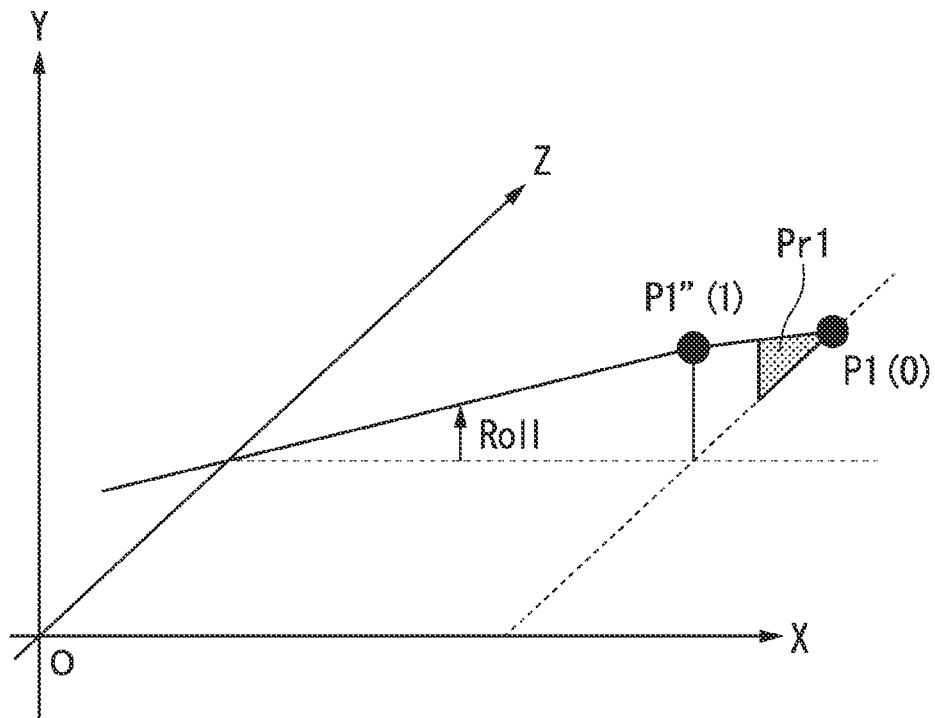
FIG. 9 is a diagram which shows the movement of a target in the XYZ coordinate system when an LIDAR is attached to a vehicle while inclined only in a roll direction.

FIG. 9 is a diagram which shows the movement of the target 300 in the XYZ coordinate system when the LIDAR 14 is attached to the vehicle M while inclined only in the roll direction. In FIG. 9, Roll is the roll angle of the LIDAR 14. P1(0) is the coordinates of the target 300 at the time T=0, and P1"(1) is the coordinates of the target 300 at the time T=1. Pr1 is an angle of the pitch component generated by the inclination of the LIDAR 14 in the roll direction.

Figure 10:
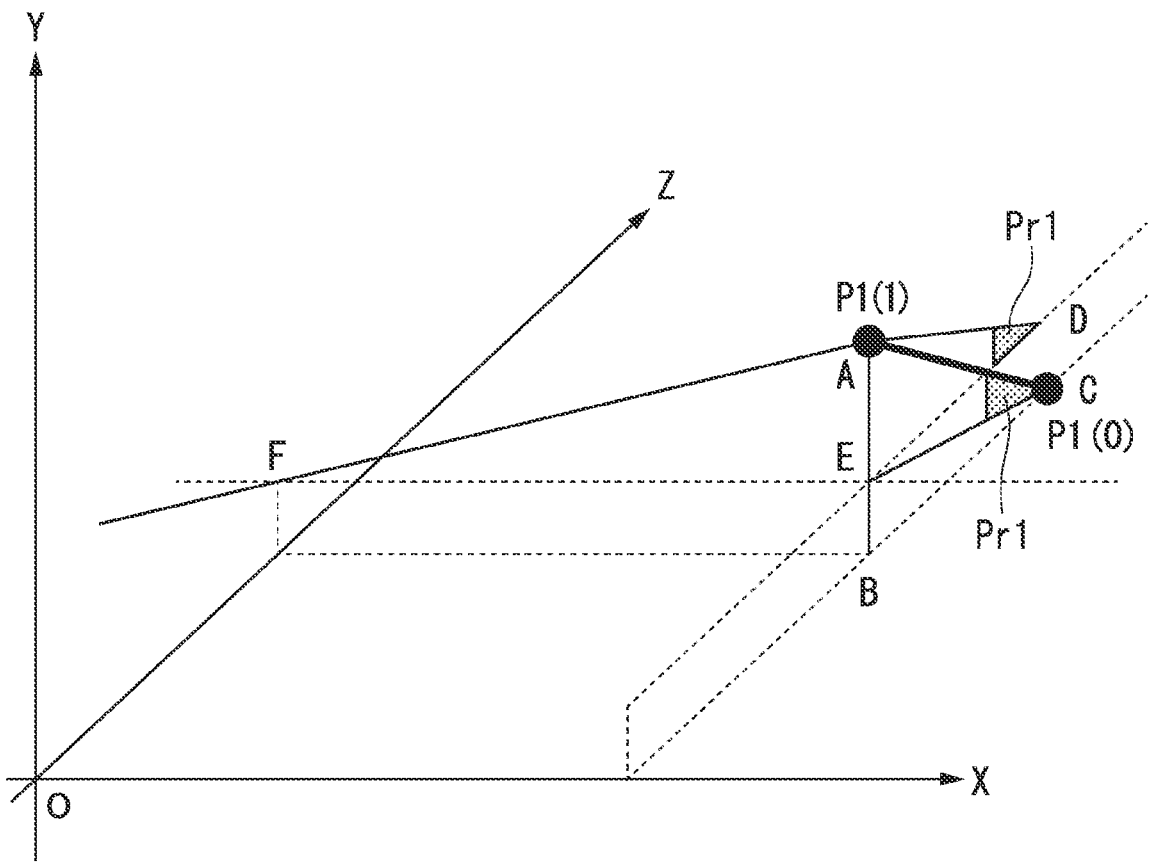
FIG. 10 is a diagram which shows the movement of a target in the XYZ coordinate system when an LIDAR is attached to a vehicle while inclined in the pitch direction and the roll direction.

FIG. 10 is a diagram which shows the movement of the target 300 in the XYZ coordinate system when the LIDAR 14 is attached to the vehicle M while inclined in the pitch direction and the roll direction. In FIG. 10, the pitch angle of the LIDAR 14 is equal to Pitch shown in FIG. 8, and the roll angle of the LIDAR 14 is equal to Roll shown in FIG. 9. P1(0) is the coordinates of the target 300 at the time T=0, and P1(1) is the coordinates of the target 300 at the time T=1. In this case, P1(1)=P1'(1)+P1"(1).

Point A is a point indicating a position of P1(1). Point B is an intersection of the XZ plane and a straight line passing through the point A and perpendicular to the XZ plane. In other words, the point B is a point at which a Y coordinate of the point A is 0. Point C is a point indicating a position of P1(0). Point E is a point indicating a position of P1'(1) in FIG. 8. Point D is an intersection of a straight line passing through the point C and perpendicular to the XZ plane and a plane parallel to the XZ plane including the point E. In other words, the point D is a point where a Y coordinate of the point C is equal to a Y coordinate of the point E.

In FIG. 10, since the roll angle (Roll) of the LIDAR 14 is a small value, the value of Pr1 is also small. For this reason, it is approximated that ∠ACE=Pr1 and ∠ADE=Pr1. In a triangle ABC, ∠ACB can be represented as in Equation (2).

[Math 2]

$$\angle ACB = \angle ACE + \angle BCE \quad \text{Equation (2)}$$
$$= Pr1 + \text{Pitch}$$

In a triangle AEF, AE=FE·tan(Roll). Moreover, in a triangle AED, AE≈DE·tan(Pr1). When Equation (2) is substituted into this equation, it is assumed that AE=DE·tan(∠ACB−Pitch). Equation (3) can be obtained based on this.

[Math 3]

$$FE \cdot \tan(\text{Roll}) = DE \cdot \tan(\angle ACB - \text{Pitch}) \quad \text{Equation (3)}$$

In addition, since Roll, Pitch, and ∠ACB have small values, Equation (4) can be obtained by modifying Equation (3).

[Math 4]

$$FE \cdot \text{Roll} = DE \cdot (\angle ACB - \text{Pitch}) \quad \text{Equation (4)}$$

Furthermore, Equation (5) can be obtained by modifying Equation (4).

[Math 5]

$$\text{Roll} = \frac{DE}{FE} \cdot (\angle ACB - \text{Pitch}) \quad \text{Equation (5)}$$

As described above, since P1(0)=(X1(0),Y1(0),Z1(0)), and P1(1)=(X1(1),Y1(1),Z1(1)), Equation (6) can be obtained.

[Math 6]

$$\text{Roll} = \frac{Z1(0) - Z1(1)}{X1(1)} \cdot \left( \frac{Y1(1) - Y1(0)}{Z1(0) - Z1(1)} - \text{Pitch} \right) \quad \text{Equation (6)}$$

When a coefficient in Equation (6) is defined as a coefficient α1 shown in Equation (7) and a coefficient β2 shown in Equation (8), Equation (9) can be obtained.

[Math 7]

$$\alpha 1 = \frac{Z1(0) - Z1(1)}{X1(1)} \quad \text{Equation (7)}$$

[Math 8]

$$\beta 1 = \frac{Y1(1) - Y1(0)}{Z1(0) - Z1(1)} \quad \text{Equation (8)}$$

[Math 9]

$$\text{Roll} = \alpha 1 \cdot (\beta 1 - \text{Pitch}) \quad \text{Equation (9)}$$

Figure 11:
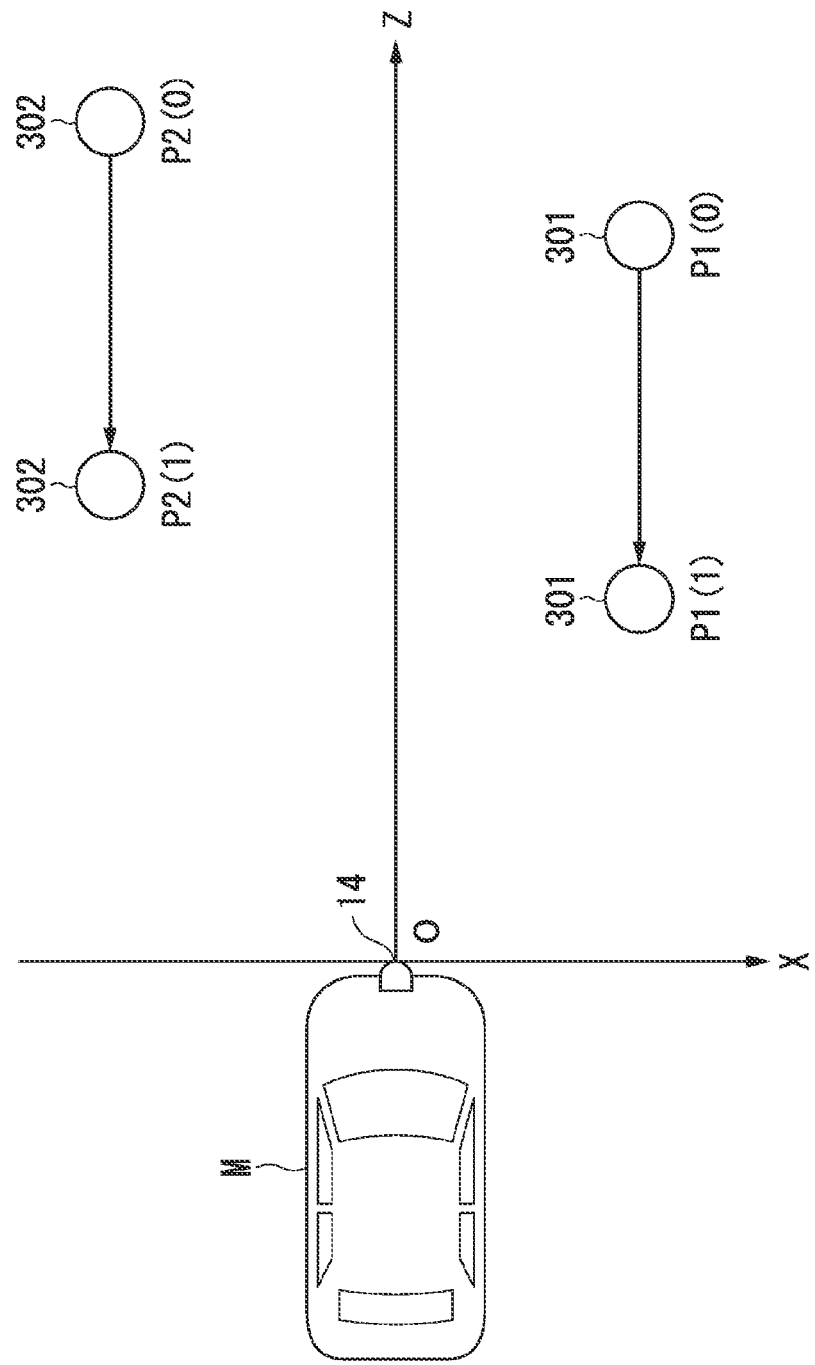
FIG. 11 is a diagram which shows relative movement of a plurality of targets based on a position of the LIDAR.

FIG. 11 is a diagram which shows the relative movement of a plurality of targets 301 and 302 with respect to the position of the LIDAR 14. In FIG. 11, a first target 301 is a stationary object present on the right side in the traveling direction (the Z direction) of the vehicle M. A second target 302 is a stationary object present on the left side in the traveling direction (the Z direction) of the vehicle M.

P1(0) is coordinates of the first target 301 at the time of T=0. P1(1) is the coordinates of the first target 301 when the time T=1. P2(0) is coordinates of the second target 302 at the time of T=0. P2(1) is the coordinates of the second target 302 at the time of T=1.

These coordinates are represented as follows.
P1(0)=(X1(0),Y1(0),Z1(0))
P1(1)=(X1(1),Y1(1),Z1(1))
P2(0)=(X2(0),Y2(0),Z2(0))
P2(1)=(X2(1),Y2(1),Z2(1))

As described above, Equations (7) to (9) described above can be obtained by obtaining the coordinates P1(0) and P1(1) of the first target 301. Similarly, Equations (10) to (12) can be obtained by obtaining the coordinates P2(0) and P2(1) of the second target 302.

[Math 10]

$$\alpha 2 = \frac{Z2(0) - Z2(1)}{X2(1)} \quad \text{Equation (10)}$$

[Math 11]

$$\beta 2 = \frac{Y2(1) - Y2(0)}{Z2(0) - Z2(1)} \quad \text{Equation (11)}$$

[Math 12]

$$\text{Roll} = \alpha 2 \cdot (\beta 2 - \text{Pitch}) \quad \text{Equation (12)}$$

Moreover, Equation (13) and Equation (14) can be obtained based on Equation (9) and Equation (12).

[Math 13]

$$\text{Pitch} = \frac{\alpha 1 \cdot \beta 1 - \alpha 2 \cdot \beta 2}{\alpha 1 - \alpha 2} \quad \text{Equation (13)}$$

[Math 14]

$$\text{Roll} = \alpha 1 \cdot (\beta 1 - \text{Pitch}) \quad \text{Equation (14)}$$

$$= \frac{\alpha 1 \cdot \alpha 2}{\alpha 1 - \alpha 2} \cdot (\beta 2 - \beta 1)$$

Therefore, the detection device 15 can calculate the pitch angle (Pitch) of the LIDAR 14 with respect to the horizontal direction using Equation (13). The detection device 15 can calculate the roll angle (Roll) of the LIDAR 14 with respect to the horizontal direction using Equation (14). In this manner, the detection device 15 can detect the pitch angle and the roll angle of the LIDAR 14 with respect to the horizontal direction based on results of detection of a plurality of targets present in the traveling direction of the vehicle M.

[Flowchart of Detection Device]

FIG. 12 is a flowchart which shows a flow of processing executed by the detection device 15.

First, the acquisition unit 150 of the detection device 15 acquires results of detection of a plurality of targets present in the traveling direction of the vehicle M from the LIDAR 14 attached to the vehicle M (S101). The plurality of targets are, for example, the first target 301 and the second target 302 shown in FIG. 11.

Next, the calculation unit 152 of the detection device 15 determines whether the plurality of targets detected with the movement of the vehicle M are the same target on the basis of the results of detection from the LIDAR 14, which are acquired by the acquisition unit 150, and calculates coordinates of each of the plurality of targets in chronological order (S102). Specifically, the calculation unit 152 determines that the first target 301 detected at the time T=0 and the first target 301 detected at the time T=1 are the same target, and calculates the coordinates P1(0) and P1(1) of the first target 301. In addition, the calculation unit 152 determines that the second target 302 detected at the time T=0 and the second target 302 detected at the time T=1 are the same target, and calculates the coordinates P2(0) and P2(1) of the second target 302.

Next, the detection unit 154 of the detection device 15 detects the pitch angle and the roll angle of the LIDAR 14 with respect to the horizontal direction based on the coordinates of each of the plurality of targets calculated in chronological order by the calculation unit 152 (S103). Specifically, the detection unit 154 calculates Pitch and Roll using Equation (13) and Equation (14) described above, detects a value of Pitch as the pitch angle of the LIDAR 14 with respect to the horizontal direction, and detects a value of Roll as the roll angle of the LIDAR 14 with respect to the horizontal direction. As a result, the detection device 15 can detect both the pitch angle and the roll angle of the LIDAR 14 with respect to the horizontal direction simultaneously and accurately.

Next, the correction unit 156 of the detection device 15 corrects the coordinates of each of the plurality of targets based on the pitch angle (Pitch) and the roll angle (Roll) detected by the detection unit 154 (S104). Specifically, the correction unit 156 converts the coordinates of the first target 301 and the coordinates of the second target 302 (coordinates of the coordinate system based on the optical axis of the LIDAR 14) calculated by the calculation unit 152 into coordinates of an actual coordinate system with respect to the traveling direction of the vehicle M. For example, the correction unit 156 converts the coordinates of the first target 301 and the coordinates of the second target 302 by using a rotation matrix according to the pitch angle (Pitch) and the roll angle (Roll). As a result, the detection device can accurately detect the position of a target present in the periphery of the vehicle M even when the LIDAR 14 is attached to the vehicle M while being inclined with respect to the horizontal direction.

The detection device 15 transmits the coordinates of each of the plurality of targets corrected by the correction unit 156 to the automated driving control device 100 via the object recognition device 16. The automated driving control device 100 controls the vehicle M according to the coordinates of each of the plurality of targets corrected by the correction unit 156. As a result, the automated driving control device 100 can perform appropriate automated driving control on the basis of the accurate position of a target.

According to the present embodiment described above, the detection device 15 calculates the coordinates of each of the plurality of targets in chronological order on the basis of the result of detection from the LIDAR 14, and detects the pitch angle and the roll angle of the LIDAR 14 with respect to the horizontal direction based on the coordinates calculated in chronological order. As a result, both the pitch angle and the roll angle of the LIDAR 14 with respect to the horizontal direction can be detected simultaneously and accurately.

Note that the correction unit 156 may not correct the coordinates of each of the plurality of targets when at least one of the pitch angle and the roll angle detected by the detection unit 154 exceeds a preset threshold value, and may output a correction value for correcting the coordinates of each of the plurality of targets to the LIDAR 14. In this case, the LIDAR 14 may correct the coordinates of each of the plurality of targets on the basis of the correction value input from the detection device 15. As a result, a processing load of the detection device 15 can be reduced.

In addition, detection processing of the pitch angle and the roll angle by the detection device 15 can be preferably executed when the vehicle M is traveling straight. For this reason, the acquisition unit 150 may acquire a result of detection of an angular speed around the vertical axis of the vehicle M from the yaw rate sensor attached to the vehicle M, and, when the result of detection by the yaw rate sensor, acquired by the acquisition unit 150, is not within a predetermined range (in other words, when the vehicle M is traveling on a curve), the detection unit 154 may not detect the pitch angle and the roll angle. As a result, it is possible to reduce erroneous detections of the pitch angle and the roll angle.

The embodiment described above can be expressed as follows.

A detection device includes a storage device that stores a program, and a hardware processor, the hardware processor executes the program stored in the storage device, thereby acquiring results of detection of a plurality of targets present in a traveling direction of a vehicle from an imaging device attached to the vehicle, calculating coordinates of each of the plurality of targets in chronological order on the basis of the results of detection, and detecting a pitch angle and a roll angle of the imaging device with respect to a horizontal direction based on the coordinates calculated in chronological order.

Although a mode for carrying out the present invention has been described above using the embodiment, the present invention is not limited to the embodiment, and various modifications and substitutions can be made within a range not departing from the gist of the present invention.

What is claimed is:

1. A detection device comprising:
a processor that functions as:
an acquisition unit configured to acquire a detection result of a plurality of targets present in a traveling direction of a vehicle from an imaging device attached to the vehicle;
a calculation unit configured to determine whether the plurality of targets detected with movement of the vehicle are an identical target based on the detection result acquired by the acquisition unit and calculate a coordinate of each of the plurality of targets in chronological order; and
a detection unit configured to detect a pitch angle and a roll angle of the imaging device with respect to a horizontal direction based on the coordinate calculated in chronological order by the calculation unit,
wherein the plurality of targets include a first target present on a right side in the traveling direction of the vehicle and a second target present on a left side in the traveling direction of the vehicle,
the calculation unit calculates a first coordinate indicating a coordinate of the first target at a first time, a second coordinate indicating a coordinate of the second target at the first time, a third coordinate indicating a coordinate of the first target at a second time later than the first time, and a fourth coordinate indicating a coordinate of the second target at the second time, and
the detection unit detects the pitch angle and the roll angle based on the first coordinate at the first time, the second coordinate at the first time, the third coordinate at the second time, and the fourth coordinate at the second time that are calculated by the calculation unit; and
wherein based on the pitch angle, the roll angle, the first coordinate at the first time, the second coordinate at the first time, the third coordinate at the second time, and the fourth coordinate at the second time, the processor causes the vehicle to move in the traveling direction.

2. The detection device according to claim 1,
wherein the processor functions as:
a correction unit configured to correct the coordinate of each of the plurality of targets based on the pitch angle and the roll angle that are detected by the detection unit.

3. The detection device according to claim 2,
wherein, when at least one of the pitch angle and the roll angle that are detected by the detection unit exceeds a preset threshold value, the correction unit outputs a correction value for correcting the coordinate of each of the plurality of targets to the imaging device instead of correcting the coordinate of each of the plurality of targets.

4. The detection device according to claim 1,
wherein the acquisition unit acquires a detection result of an angular speed around a vertical axis of the vehicle from a yaw rate sensor attached to the vehicle, and
the detection unit does not detect the pitch angle and the roll angle when the detection result from the yaw rate sensor which is acquired by the acquisition unit is not within a predetermined range.

5. The detection device according to claim 1,
wherein the imaging device is a LIDAR that detects a distance from the vehicle to each of the plurality of targets.

6. A vehicle system comprising:
the detection device according to claim 1; and
a control device configured to control the vehicle according to the coordinate of each of the plurality of targets.

7. A detection method comprising:
by a computer,
acquiring a detection result of a plurality of targets present in a traveling direction of a vehicle from an imaging device attached to the vehicle;
determining whether the plurality of targets detected with movement of the vehicle are an identical target based on the detection result, and calculating a coordinate of each of the plurality of targets in chronological order; and
detecting a pitch angle and a roll angle of the imaging device with respect to a horizontal direction based on the coordinate calculated in chronological order,
wherein the plurality of targets include a first target present on a right side in the traveling direction of the vehicle and a second target present on a left side in the traveling direction of the vehicle, and
the detection method further comprises:
calculating a first coordinate indicating a coordinate of the first target at a first time, a second coordinate indicating a coordinate of the second target at the first time, a third coordinate indicating a coordinate of the first target at a second time later than the first time, and a fourth coordinate indicating a coordinate of the second target at the second time; and
detecting the pitch angle and the roll angle based on the calculated first coordinate at the first time, the calculated second coordinate at the first time, the calculated third coordinate at the second time, and the calculated fourth coordinate at the second time; and
wherein based on the pitch angle, the roll angle, the first coordinate at the first time, the second coordinate at the first time, the third coordinate at the second time, and the fourth coordinate at the second time, the computer causes the vehicle to move in the traveling direction.

8. A computer-readable non-transitory storage medium that includes a program causing a computer to execute:
acquiring a detection result of a plurality of targets present in a traveling direction of a vehicle from an imaging device attached to the vehicle;
determining whether the plurality of targets detected with movement of the vehicle are an identical target based on the detection result, and calculating a coordinate of each of the plurality of targets in chronological order; and
detecting a pitch angle and a roll angle of the imaging device with respect to a horizontal direction based on the coordinate calculated in chronological order,
wherein the plurality of targets include a first target present on a right side in the traveling direction of the vehicle and a second target present on a left side in the traveling direction of the vehicle, and
the program further causes the computer to execute:
calculating a first coordinate indicating a coordinate of the first target at a first time, a second coordinate indicating a coordinate of the second target at the first time, a third coordinate indicating a coordinate of the first target at a second time later than the first time, and a fourth coordinate indicating a coordinate of the second target at the second time; and
detecting the pitch angle and the roll angle based on the calculated first coordinate at the first time, the calculated second coordinate at the first time, the calculated third coordinate at the second time, and the calculated fourth coordinate at the second time; and
wherein based on the pitch angle, the roll angle, the first coordinate at the first time, the second coordinate at the first time, the third coordinate at the second time, and the fourth coordinate at the second time, the computer causes the vehicle to move in the traveling direction.

* * * * *